US012639991B2

(12) United States Patent
Kang et al.

(10) Patent No.: US 12,639,991 B2
(45) Date of Patent: May 26, 2026

(54) APPARATUS AND METHOD FOR DETERMINING STUCK

(71) Applicants: HYUNDAI MOTOR COMPANY, Seoul (KR); KIA CORPORATION, Seoul (KR); Industry-University Cooperation Foundation Hanyang University, Seoul (KR)

(72) Inventors: Jun Han Kang, Seoul (KR); Ik Jin Um, Busan (KR); Ji Hun Byun, Hwaseong-si (KR); Man Dong Kim, Hwaseong-si (KR); Jung Ho Park, Incheon (KR); Jin Soo Seo, Suwon-si (KR); Chan Uk Yang, Seoul (KR); Seung Won Choi, Seoul (KR); Hyuk Ju Shon, Seoul (KR); Kun Soo Huh, Seoul (KR)

(73) Assignees: HYUNDAI MOTOR COMPANY, Seoul (KR); KIA CORPORATION, Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 121 days.

(21) Appl. No.: 18/383,068

(22) Filed: Oct. 24, 2023

(65) Prior Publication Data

US 2024/0386758 A1 Nov. 21, 2024

(30) Foreign Application Priority Data

May 16, 2023 (KR) ........................ 10-2023-0062914

(51) Int. Cl.
*G07C 5/04* (2006.01)

(52) U.S. Cl.
CPC ..................................... *G07C 5/04* (2013.01)

(58) Field of Classification Search
CPC ......... G07C 5/04; B60W 40/10; B60W 50/14; B60W 2520/10; B60W 2520/26; B60W 2520/30; B60W 2540/10; B60W 2756/10
USPC ........................................................... 701/70
See application file for complete search history.

(56) References Cited

U.S. PATENT DOCUMENTS

2021/0055728 A1 2/2021 Pomish
2022/0080952 A1* 3/2022 Um ................ B60W 30/18172

* cited by examiner

*Primary Examiner* — Lindsay M Low
*Assistant Examiner* — Omar Morales
(74) *Attorney, Agent, or Firm* — Morgan, Lewis & Bockius LLP

(57) ABSTRACT

An apparatus for determining whether a vehicle is in a stuck state may include: a receiving unit configured for receiving driving information of a vehicle; a score determination unit configured for determining a stuck score based on the driving information; and a stuck determining unit configured for determining whether a vehicle is in a stuck state based on accumulated stuck scores obtained by accumulating stuck scores.

16 Claims, 4 Drawing Sheets

APPARATUS AND METHOD FOR DETERMINING STUCK

CROSS-REFERENCE TO RELATED APPLICATION(S)

The present application claims priority to Korean Patent Application No. 10-2023-0062914 filed on May 16, 2023, the entire contents of which is incorporated herein for all purposes by this reference.

BACKGROUND OF THE PRESENT DISCLOSURE

Field of the Present Disclosure

The present disclosure relates to an apparatus and a method for determining a stuck state.

DESCRIPTION OF RELATED ART

Off-road roads refer to unpaved roads such as mountain roads and rough roads where traces of nature remain, rather than paved asphalt roads. Off-road roads may be comprised of mud or sand, rough and sharp stones and gravel, bumpy surfaces, and steep slopes. Recently, the number of people driving off-road and enjoying leisure sports is increasing.

Meanwhile, when driving off-road, a vehicle may be stuck, unlike on a general road. Here, the term “stuck” refers to a state in which a vehicle is stuck in mud or sand so that the vehicle cannot move.

When the vehicle is in a stuck state, it is possible to get out of the state in which the vehicle is stuck by operating the vehicle. However, excessive driving in a state in which the vehicle is stuck without knowing that the vehicle is in a stuck state may rather increase the degree to which the vehicle is in a stuck state. Furthermore, when an unskilled driver operates the vehicle, the vehicle may become more seriously stuck.

Accordingly, when a vehicle is in a stuck state, it may be desirable to notify a user of occurrence of a stuck state of the vehicle and operate the vehicle so that the user can escape from the stuck state by himself, or request rescue, such as calling a tow truck.

Therefore, an apparatus or method configured for accurately determining whether a vehicle is in a stuck state is required to smoothly cope with the user and prevent the vehicle from deteriorating the stuck state.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for accurately determining whether a driving vehicle is in a stuck state.

According to an aspect of the present disclosure, an apparatus for determining a stuck state may include: a receiving unit for receiving driving information of a vehicle; a score determination unit for determining a stuck score based on the driving information; and a stuck determining unit for determining whether the vehicle is in the stuck state based on accumulated stuck scores obtained by accumulating stuck scores.

The driving information may include at least one of an accelerator opening rate, a wheel slip rate, torque, and vehicle speed.

The stuck score may include a subtracted stuck score and an added stuck score, and the stuck score determination unit may have different conditions for determining the subtracted stuck score and the added stuck score.

The score determination unit may be configured to determine whether to perform a process of determining the subtracted stuck score or the added stuck score based on the driving information.

The added stuck score may include at least two or more added stuck scores determined based on the driving information, and in determining the added stuck score, the stuck determining unit may be configured to determine one of the two or more added stuck scores.

When the subtracted stuck score or the added stuck score received from the score determination unit is accumulated, and the accumulated stuck scores exceed a preset reference stuck score, the stuck determining unit may be configured to determine that the vehicle is in a stuck state.

A notifying unit configured for notifying a user of a result obtained from the stuck determining unit may be further included.

A transmitting unit including a communication means configured for transmitting the result obtained from the stuck determining unit to a server may be further included.

According to another aspect of the present disclosure, a method for determining a stuck state may include operations of: receiving driving information of a vehicle, determining a stuck score based on the driving information, and determining whether the vehicle is in the stuck state based on accumulated stuck scores obtained by accumulating stuck scores.

The driving information may include at least one of an accelerator opening rate, a wheel slip rate, torque, and vehicle speed.

The stuck score may include a subtracted stuck score and an added stuck score, and an operation of determining the stuck score may have different conditions for determining the subtracted stuck score and the added stuck score.

The operation of determining the stuck score may further include determining whether to select and perform one of the operations of determining a subtracted stuck score or an added stuck score based on the driving information.

The added stuck score may include at least two or more added stuck scores determined based on the driving information, and in determining the added stuck score, the operation of determining the stuck score may further include an operation of determining one of the two or more added stuck scores.

When accumulated stuck scores obtained by accumulating the subtracted stuck score or the added stuck score determined in the operation of determining the stuck score are determined, and the accumulated stuck scores exceed a preset reference stuck score, the operation of determining whether the vehicle is in a stuck state may be configured to determine that the vehicle is in a stuck state.

When it is determined that the vehicle is in a stuck state in the operation of determining whether the vehicle is in a stuck state, an operation of notifying a user of occurrence of a stuck state of the vehicle may be further included.

When it is determined that the vehicle is in a stuck state in the operation of determining whether the vehicle is in a stuck state, an operation of transmitting the occurrence of a stuck state of the vehicle to a server using a transmitting unit including a communication means may be further included.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
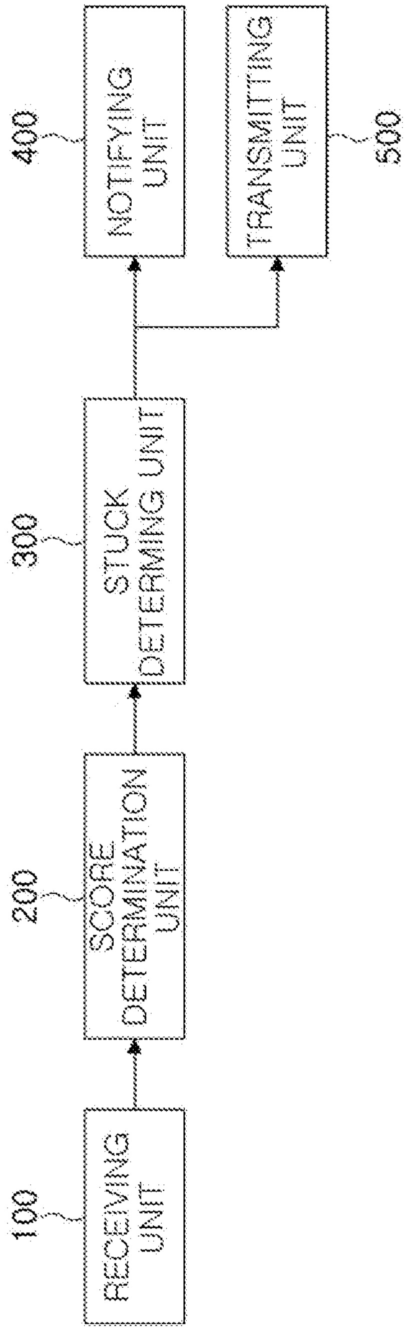
FIG. 1 is a block diagram of an apparatus for determining a stuck state according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims. Because the present disclosure may have various changes and may have various exemplary embodiments of the present disclosure, specific embodiments may be illustrated in the drawings and described in detail. However, this is not intended to limit the present disclosure to specific embodiments, it should be understood to include all modifications, equivalents, and substitutes included in the spirit and scope of the present disclosure.

Terms such as first, second, and the like may be used to describe various elements, but the elements should not be limited by the terms. The above terms may be used only for distinguishing one component from another. For example, without departing from the scope of the present disclosure, a first component may be referred to as a second component, and similarly, a second component may also be referred to as a first component. The term "and/or" may include a combination of a plurality of related listed items or any of the plurality of related listed items.

The terms used in the present application may be only used to describe specific embodiments, and are not intended to limit the present disclosure. The singular expression may include the plural expression, unless the context clearly dictates otherwise In the present application, it should be understood that terms such as "include," "comprise," or "have" are intended to designate that features, numerals, steps, operations, components, parts, or combination thereof described in the specification exists, but one or more other features of these does not preclude the existence or addition of numbers, steps, operations, components, parts, or combinations thereof.

Unless defined otherwise, all terms used herein, including technical or scientific terms, include the same meaning as that which can commonly understood by one of ordinary skill in the art to which the present disclosure belongs. Terms such as those defined in a commonly used dictionary should be interpreted as including a meaning consistent with the meaning in the context of the related art, and should not be interpreted in an ideal or excessively formal manner unless explicitly defined in the present application.

Hereinafter, various exemplary embodiments of the present disclosure will be described in more detail with reference to the accompanying drawings.

FIG. 1 is a block diagram of an apparatus for determining whether a vehicle is in a stuck state according to an exemplary embodiment of the present disclosure.

Referring to FIG. 1, the apparatus for determining whether the vehicle is in a stuck state may include a receiving unit 100, a score determination unit 200, and a stuck determining unit 300. The apparatus for determining whether the vehicle is in a stuck state according to an exemplary embodiment of the present disclosure may determine a stuck score based on driving information of a vehicle. Here, the stuck score is a value determined based on a driving state of the vehicle and may include a positive value or a negative value. Whether the vehicle is in a stuck state may be determined based on accumulated stuck scores determined by accumulating stuck scores including positive and negative values. It is possible to finally determine whether the vehicle is in a stuck state by comparing the accumulated stuck scores determined by the driving state with a reference stuck score. In other words, the apparatus for determining a stuck state may be configured to determine whether the vehicle is in a stuck state based on the accumulated stuck scores summed by sequentially adding or subtracting the determined stuck score.

The receiving unit 100 may receive information on a driving state of the vehicle. For example, the receiving unit 100 may receive an accelerator opening rate, a wheel slip rate, torque, and driving speed of the vehicle. The receiving unit 100 may be connected to sensors provided in the vehicle using a network provided in the vehicle to receive information on the driving state of the vehicle. For example, the receiving unit 100 may receive accelerator opening rate information from an accelerator pedal sensor (APS) using a CAN network of the vehicle.

The score determination unit 200 may be configured to determine a stuck score based on driving state information of the vehicle received from the receiving unit 1X). The score determination unit 200 may include a method of determining an added stuck score and a method of determining a subtracted stuck score. The score determination unit 200 may select a method of determining an added stuck score and a method of determining a subtracted stuck score based on the driving information of the vehicle. Here, the added stuck score is a stuck score including a positive value and may be a stuck score added to the accumulated stuck scores. Furthermore, the subtracted stuck score is a stuck score including a negative value, and may be a stuck score subtracted from the accumulated stuck scores.

The score determination unit 200 may set an addition condition and a subtraction condition, determine a stuck score according to the condition, and subtract or add the accumulated stuck scores. For example, when the accelerator opening rate of the vehicle is less than a preset value (e.g., 90%) and the torque is less than a preset value (e.g., 45%), the score determination unit 200 may be configured to determine a subtracted stuck score, to subtract the subtracted stuck score from the accumulated stuck scores.

Here, the torque may be a value received through the CAN network of the vehicle, and the torque may be received as a ratio of the current output torque to the total amount of torque which may be output from the vehicle. However, it is not limited thereto, and the ratio of the current output torque to the total amount of torque may be substituted and controlled based on the current output torque value.

Furthermore, when the accelerator opening rate of the vehicle exceeds a preset value (e.g., 90%) and the torque exceeds a preset value (e.g., 33%), the score determination unit 200 may be configured to determine an added stuck score, to add the added stuck score to the accumulated stuck scores.

When determining the subtracted stuck score, the score determination unit 200 may be configured to determine whether to apply the subtracted stuck score to the accumulated stuck scores based on the wheel slip rate and vehicle speed.

The stuck determining unit 300 may be configured to determine whether the vehicle is in a stuck state based on the accumulated stuck scores obtained by accumulating the stuck scores determined by the score determination unit 200 When it is determined that the vehicle is in a stuck state, the stuck determining unit 300 may transmit occurrence of a stuck state to a notifying unit 400 and/or a transmitting unit 500.

The notifying unit 400 may visually or audibly notify a user of the occurrence of a stuck state. For example, the notifying unit 400 may visually notify a user of the occurrence of a stuck state by popping up a message of the occurrence of a stuck state using a cluster including a display of a vehicle. Furthermore, the notifying unit 400 may audibly notify a user of the occurrence of a stuck state through sound using an audio device. Furthermore, a visual method and an auditory method may be applied separately or simultaneously.

The transmitting unit 500 may transmit the occurrence of a stuck state of the vehicle and vehicle information to a server using a communication means such as Internet, LTE, 5G, Wi-Fi, Bluetooth. Near Field Communication (NFC). Zigbee, Radio Frequency (RF), and the like. The occurrence of a stuck state of the vehicle and vehicle information transmitted from the transmitting unit 500 may be transmitted to the user or to the server through the server. The user can check the information regarding the occurrence of a stuck state of the vehicle received from the server by accessing the web using a computer, or through an app installed on a terminal (e.g., mobile phone) used by the user. In addition thereto, the transmitting unit 500 may call a tow truck using a server or an app.

Components of an apparatus for determining a stuck state may be wired and wirelessly connected to exchange information using a network provided in the vehicle. For example, data may be exchanged using a network communication means provided in a vehicle such as Ethernet, Media Oriented Systems Transport (MOST). Flexray, Controller Area Network (CAN), Local Interconnect Network (LIN). Internet, LTE, 5G, Wi-Fi, Bluetooth, Near Field Communication (NFC), Zigbee. Radio Frequency (RF), and the like.

In an exemplary embodiment of the present invention, the apparatus for determining whether the vehicle is in a stuck state, including a receiving unit 100, a score determination unit 200, a stuck determining unit 300, the notifying unit 400 and the transmitting unit 400 may be implemented by a controller or a computer including a processor.

In various exemplary embodiments of the present disclosure, the controller may be implemented in a form of hardware or software, or may be implemented in a combination of hardware and software.

In various exemplary embodiments of the present disclosure, each operation described above may be performed by a control device, and the control device may be configured by multiple control devices, or an integrated single control device.

Alternatively, each of the receiving unit 100, the score determination unit 200, the stuck determining unit 300, the notifying unit 400 and the transmitting unit 400 may be implemented by different processors.

Figure 2:
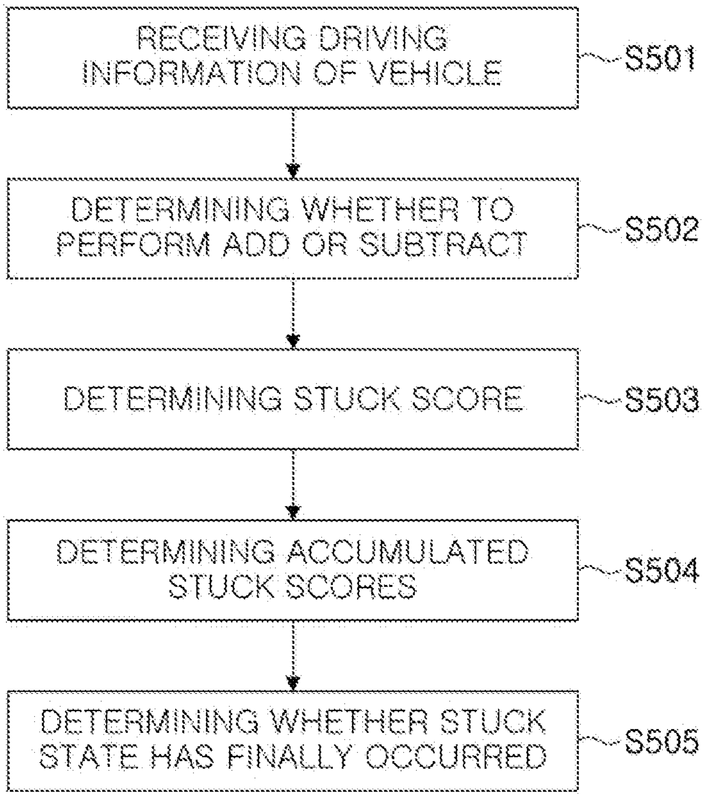
FIG. 2 is a block diagram of a method for determining a stuck state according to an exemplary embodiment of the present disclosure.

FIG. 2 is a block diagram of a method for determining a stuck state according to an exemplary embodiment of the present disclosure.

Referring to FIG. 2, the method for determining a stuck state according to an exemplary embodiment of the present disclosure may include an operation of receiving vehicle driving information (S501). Vehicle driving information may be received through a receiving unit 100. Here, the vehicle driving information may be received using a network (e.g., CAN) provided in the vehicle. Furthermore, the vehicle driving information may include an accelerator opening rate of the vehicle, wheel slip rate, and driving speed of the vehicle.

In the method for determining a stuck state according to an exemplary embodiment of the present disclosure, whether to add or subtract a stuck score based on the received vehicle driving information may be determined (S502). In the method for determining a stuck state according to an exemplary embodiment of the present disclosure, whether a vehicle is in a stuck state may be determined by estimating accumulated stuck scores obtained by accumulating the stuck scores, and the accumulated stuck scores may be determined by accumulating an added stuck score and a subtracted stuck score. Here, the added stuck score is a stuck score including a positive value, and may be a stuck score added to the accumulated stuck scores. Furthermore, the subtracted stuck score is a stuck score including a negative value, and may be a stuck score subtracted from the accumulated stuck scores.

In the method for determining a stuck state according to an exemplary embodiment of the present disclosure, after determining whether to add or subtract based on driving information of the vehicle, a stuck score may be determined by different methods for determining the subtracted stuck score and the added stuck score (S503). For example, in the method for determining a stuck state according to an exemplary embodiment of the present disclosure, when an accelerator opening rate is less than a preset value (e.g., 90%) and torque is less than a preset value (e.g., 45%) at the same time, a subtracted stuck score may be determined. Furthermore, when the accelerator opening rate is less than a preset value (e.g., 90%) or the torque exceeds a preset value (e.g., 4-3.%), it may be determined that an added stuck score may be determined. Whether the subtracted stuck score is applied to the accumulated stuck score may be determined based on a vehicle's wheel slip rate and vehicle speed. For example, after a driving condition is determined to subtract the stuck score, when the wheel slip rate is less than a preset value (e.g., 70%), and the vehicle speed exceeds a preset value (e.g., 5.5 kilometers per hour (km/h), it may be determined that a subtracted stuck score (e.g., −0.15) may be applied.

Furthermore, it may be determined whether the added stuck score may be applied to the accumulated stuck score based on the wheel slip rate and vehicle speed. The number of added stuck scores may be plural. For example, when the wheel slip rate exceeds a first set value (e.g., 80%), a first added stuck score (e.g., +0.12) may be applied. Furthermore, when the wheel slip rate is equal to or lower than a first set value, it may be determined whether the vehicle speed is less than a second set value (e.g., 0.5 kph). When the vehicle speed is less than the second set value, a second added stuck score (e.g., +0.05) may be applied. Furthermore, when the vehicle speed exceeds the second set value, it may be determined whether the wheel slip rate exceeds a third set value (e.g., 60%). When the wheel slip rate exceeds the third set value, a third added stuck score (e.g., +0.01) may be applied.

After the added stuck score and the subtracted stuck score are determined, an accumulated stuck score may be determined by adding the determined added stuck score and subtracted stuck score (S504). The steps S501 to S503 may be repeatedly performed until the accumulated stuck score exceeds a preset value.

Furthermore, when the accumulated stuck score exceeds a preset value, it may be determined that a stuck state has finally occurred (S505).

Figure 3:
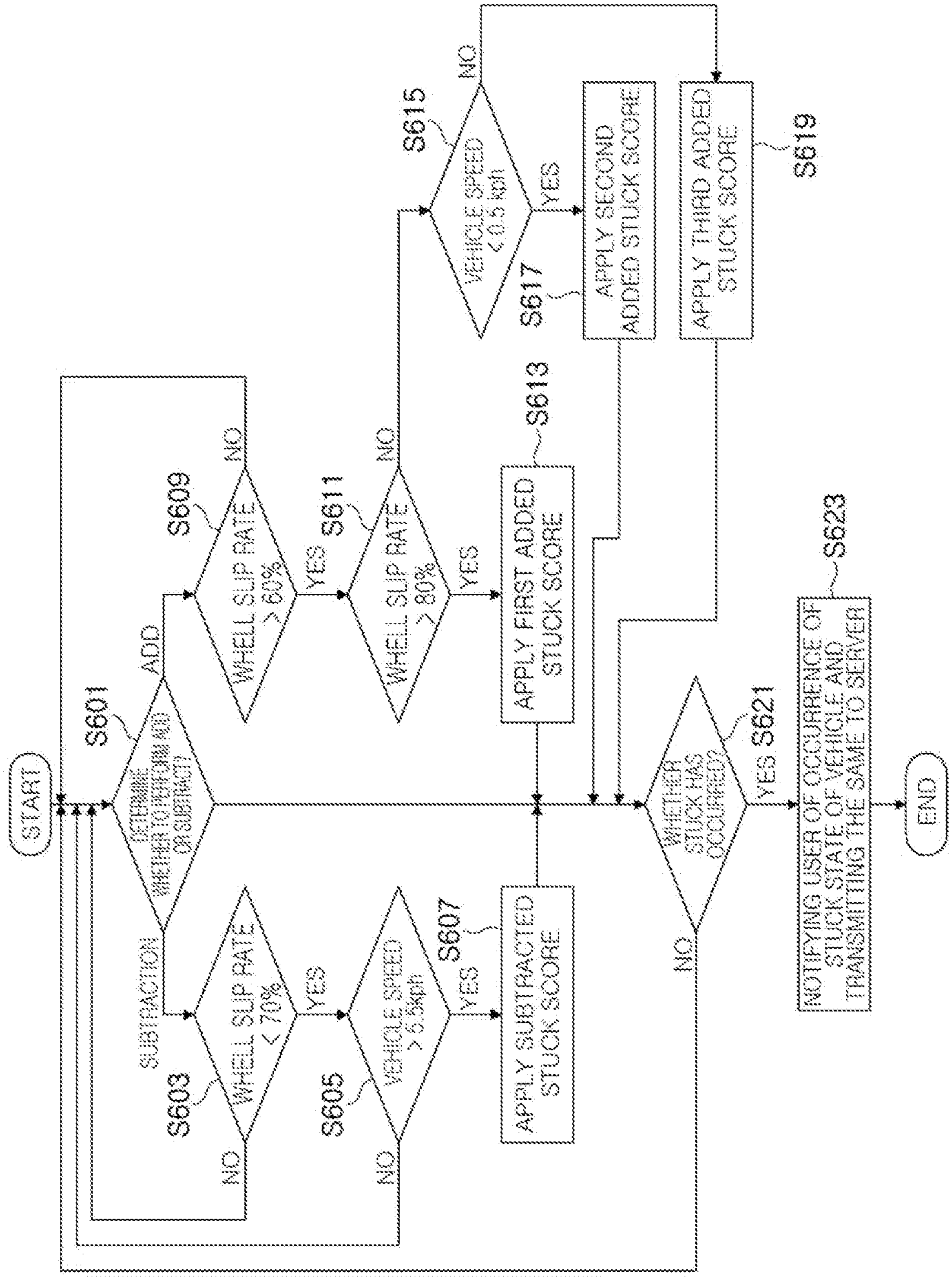
FIG. 3 is a flowchart of a method for determining a stuck state according to an exemplary embodiment of the present disclosure.
Figure 4:
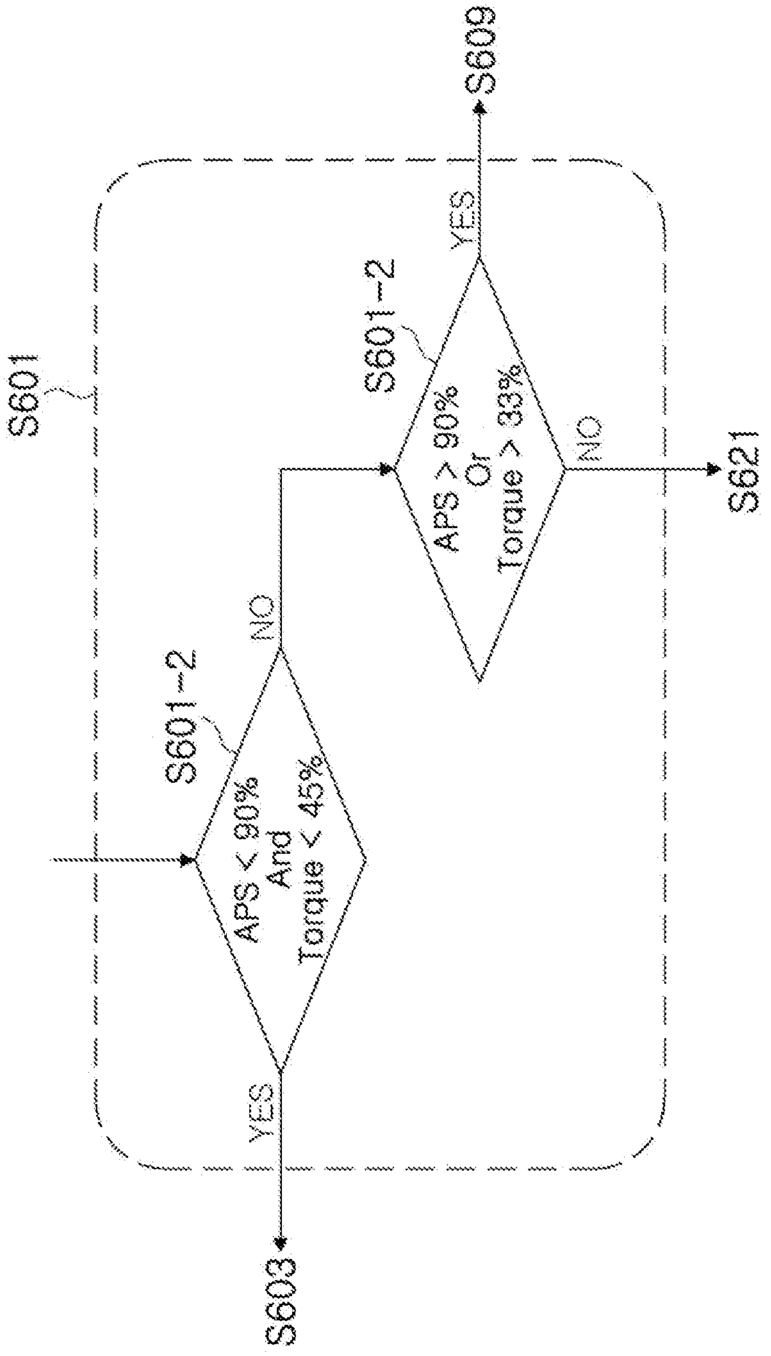
FIG. 4 is a detailed flowchart of S601 of FIG. 3.

FIG. 3 is a flowchart of a method for determining a stuck state according to an exemplary embodiment of the present disclosure, and FIG. 4 is a detailed flowchart of S601 of FIG. 3.

Referring to FIG. 3, a method for determining whether a vehicle is in a stuck state may be a method of determining a stuck score using driving information of a vehicle, and determining whether a vehicle is in a stuck state using accumulated stuck scores obtained by accumulating the determined stuck score.

Referring to FIG. 4 together with FIG. 3, in the method for determining a stuck state according to an exemplary embodiment of the present disclosure, after receiving driving information of the vehicle, it may be determined whether a subtracted stuck score is determined, or an added stuck score is determined based on the received vehicle driving information (S601).

It may be determined whether to determine a subtracted stuck score or an added stuck score based on information on an accelerator opening rate and information on torque. Here, a condition for determining the subtracted stuck score may be a condition in which the accelerator opening rate is less than a preset value (e.g., 90%) and the torque is less than a preset value (e.g., 45%) (S601-1). Furthermore, a condition determining whether to determine the added stuck score may be a condition in which the accelerator opening rate is less than a preset value (e.g., 90%) or the torque exceeds a preset value (e.g., 33%) (S601-2). Furthermore, when both the condition for determining the subtracted stuck score and the condition for determining the added stuck score are not satisfied, after checking an accumulated stuck scores to be described later (S621), step S601 may be performed based on the re-updated driving information.

Referring back to FIG. 3, when it is determined to determine the subtracted stuck score in S601, it may be determined whether the wheel slip rate is less than a preset value (e.g., 70%) (S603). When the wheel slip rate is less than a preset value (e.g., 70%), it may be determined whether the vehicle speed is less than a preset value (e.g., 5.5 kph) (S605). When the vehicle speed is greater than less than a preset value (e.g., 5.5 kph), it may be determined to apply a subtracted stuck score (e.g., −0.15) to the accumulated stuck scores (S607).

Here, when the wheel slip rate or the vehicle speed does not satisfy the preset value, it is possible to return to step S601 based on the updated driving information.

Furthermore, when it is determined to determine the added stuck score in S601, the added stuck score may be subdivided and applied based on vehicle driving information. For example, it may be determined whether the wheel slip rate exceeds a third set value (e.g., 60%) (S609).

When the wheel slip rate exceeds the third set value (e.g., 60%), it may be determined whether the wheel slip rate exceeds a first set value (e.g., 80%) (S611). Here, when the wheel slip rate exceeds the first set value (e.g., 80%), a first added stuck score (e.g., +0.12) may be applied (S613).

When the wheel slip rate does not exceed the first set value (e.g., 80%), it may be determined whether the vehicle speed is less than a second set value (e.g., 0.5 kph) (S615). Here, when the vehicle speed is less than the second set value (e.g., 0.5 kph), a second added stuck score (e.g., +0.05) may be applied (S617).

Furthermore, when the vehicle speed exceeds the second set value, a third added stuck score (e.g., +0.01) may be applied (S619).

Here, step S611 may also be performed between S617 and S619. For example, when the wheel slip rate exceeds a first set value (e.g., 80%), a first added stuck score (e.g., +0.12) may be applied (S611 and S613). Furthermore, when the wheel slip rate is less than or equal to the first set value, it may be determined whether the vehicle speed is less than a second set value (e.g., 0.5 kph) (S615). When the vehicle speed is less than the second set value, a second added stuck score (e.g., +0.05) may be applied (S617). Furthermore, when the vehicle speed exceeds the second set value, it may be determined whether the wheel slip rate exceeds a third set value (e.g., 60%) (S609). When the wheel slip rate exceeds the third set value, a third added stuck score (e.g., +0.01) may be applied (S619).

The subtracted stuck score may be subdivided and applied in the same manner as the added stuck score, and a size of the subtracted stuck score and the first, second, and third added stuck scores may be set in various ways according to the type of vehicle, or the like by the user.

After the subtracted stuck score and the added stuck score are determined, an accumulated stuck score may be estimated by accumulating the determined subtracted stuck score and the added stuck score. It may be determined whether the vehicle is in a stuck state based on the estimated accumulated stuck score (S921). For example, it may be determined whether the vehicle is in a stuck state based on whether the accumulated stuck score exceeds a reference stuck score (e.g., 12.5).

When the accumulated stuck score does not exceed the reference stuck score, by returning to step S601, steps S601 to S619 may be performed again, and an accumulated stuck score may be repeatedly updated.

Furthermore, when the accumulated stuck score exceeds the reference stuck score, the user may be notified of whether a stuck state has occurred, or the fact that the stuck state has occurred may be transmitted to the server (S623).

When it is determined that the stuck state has occurred, the fact that the stuck state has occurred may be notified to the user using a display provided in the vehicle or the notifying unit 400 including an audio. Accordingly, when the vehicle is in a stuck state, it is possible to prevent the stuck state from becoming severe due to unreasonable manipulation.

In addition, when it is determined that a stuck state has occurred, the fact that the stuck state has occurred in the vehicle may be transmitted to a server using the transmitting unit 500 provided in the vehicle. The server may notify the corresponding fact through an app installed on a user's terminal (e.g., a mobile phone) or notify a tow truck or maintenance company of the corresponding fact, so that prompt action may be possible.

The methods according to an exemplary embodiment of the present disclosure may be implemented in a form of program instructions which may be executed by various computer means and recorded on a computer readable medium. The computer readable medium may include program instructions, data files, data structures, and the like, alone or in a combination thereof.

Program instructions recorded on a computer readable medium may be specially designed and configured for the present disclosure may be known to those skilled in computer software and used. Examples of the computer readable medium include hardware devices specially configured to store and execute program instructions, such as ROM, RAM, flash memory, and the like. Examples of the program instructions include high-level language codes which may be executed by a computer using an interpreter, or the like as well as machine language codes generated by a compiler. The hardware device described above may be configured to operate with at least one software module to perform the operations of the present disclosure, and vice versa.

As set forth above, according to an exemplary embodiment of the present disclosure, whether a vehicle is in a stuck state using an accelerator opening rate, wheel slip rate, torque, and vehicle speed, may be accurately determined.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for determining whether a vehicle is in a stuck state, the apparatus comprising:

a processor configured for:

receiving driving information of the vehicle;

determining a stuck score based on the driving information; and determining whether the vehicle is in the stuck state based on accumulated stuck scores obtained by accumulating the stuck scores, wherein the stuck score includes a subtracted stuck score and an added stuck score, wherein the stuck score determination unit has different conditions for determining the subtracted stuck score and the added stuck score, and wherein whether the added stuck score is applied to the accumulated stuck scores and whether the subtracted stuck score is applied to the accumulated stuck scores are determined based on a wheel slip rate of the vehicle and a vehicle speed.

2. The apparatus of claim 1, wherein the driving information includes at least one of an accelerator opening rate, the wheel slip rate, a torque, and the vehicle speed of the vehicle.

3. The apparatus of claim 1, wherein in response that an accelerator opening rate is less than a first preset value and a torque of the vehicle is less than a second preset value, the subtracted stuck score is determined, and when the accelerator opening rate is less than the first preset value or the torque exceeds the second preset value, the added stuck score is determined.

4. The apparatus of claim 1, wherein the processor is further configured to determine whether to perform a process of determining the subtracted stuck score or the added stuck score based on the driving information.

5. The apparatus of claim 1, wherein the added stuck score includes at least two or more added stuck scores determined based on the driving information, and in determining the added stuck score, the processor is further configured to determine one of the two or more added stuck scores.

6. The apparatus of claim 1, wherein in response that the subtracted stuck score or the added stuck score is accumulated, and the accumulated stuck scores exceed a preset stuck score, the processor is further configured to determine that the vehicle is in the stuck state.

7. The apparatus of claim 1, wherein the processor is further configured for notifying a user of a result of the determining of the processor.

8. The apparatus of claim 1, wherein the processor includes a communication means configured for transmitting the result of the determining of the processor to a server.

9. A method for determining whether a vehicle is in a stuck state, the method comprising:

receiving driving information of the vehicle;

determining a stuck score based on the driving information; and determining whether the vehicle is in the stuck state based on accumulated stuck scores obtained by accumulating the stuck scores, wherein the stuck score includes a subtracted stuck score and an added stuck score, wherein in the determining of the stuck score, conditions for determining the subtracted stuck score and the added stuck score are different from each other, and wherein whether the added stuck score is applied to the accumulated stuck scores and whether the subtracted stuck score is applied to the accumulated stuck scores are determined based on a wheel slip rate of the vehicle and a vehicle speed.

10. The method of claim 9, wherein the driving information includes at least one of an accelerator opening rate, the wheel slip rate, a torque, and the vehicle speed of the vehicle.

11. The method of claim 9, wherein when an accelerator opening rate is less than a first preset value and a torque of the vehicle is less than a second preset value, the subtracted stuck score is determined, and when the accelerator opening rate is less than the first preset value or the torque exceeds the second preset value, the added stuck score is determined.

12. The method of claim 9, wherein the determining of the stuck score further includes:

determining whether to select and perform a process of determining the subtracted stuck score or the added stuck score based on the driving information.

13. The method of claim 9, wherein the added stuck score includes at least two or more added stuck scores determined based on the driving information, and wherein in determining the added stuck score, the determining of the stuck score further includes determining one of the two or more added stuck scores.

14. The method of claim 9, wherein in response that the accumulated stuck scores obtained by accumulating the subtracted stuck score or the added stuck score determined in the determining of the stuck score are determined and the accumulated stuck scores exceed a predetermined reference stuck score, the determining whether the vehicle is in the stuck state determines that the vehicle is in the stuck state.

15. The method of claim 9, further including:

in response that it is determined that the vehicle is in the stuck state in the determining whether the vehicle is in the stuck state, notifying a user of occurrence of the stuck state of the vehicle.

16. The method of claim 9, further including:

in response that it is determined that the vehicle is in the stuck state in the determining whether the vehicle is in the stuck state, transmitting the occurrence of the stuck state of the vehicle to a server using a processor including a communication means.

* * * * *